(12) United States Patent
Palmese et al.

(10) Patent No.: US 10,428,175 B2
(45) Date of Patent: Oct. 1, 2019

(54) TOUGHENING OF EPOXY THERMOSETS

(71) Applicants: Drexel University, Philadelphia, PA (US); The United States of America as represented by the Secretary of the Army, Washington, DC (US); Giuseppe R. Palmese, Hainesport, NJ (US); Fengshuo Hu, Mason, OH (US); Xing Geng, Fort Wayne, IN (US); John J. La Scala, Wilmington, DE (US)

(72) Inventors: Giuseppe R. Palmese, Hainesport, NJ (US); Fengshuo Hu, Mason, OH (US); Xing Geng, Fort Wayne, IN (US); John J. La Scala, Wilmington, DE (US)

(73) Assignees: Drexel University, Philadelphia, PA (US); The United States of America Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/507,532

(22) PCT Filed: Sep. 11, 2015

(86) PCT No.: PCT/US2015/049600
§ 371 (c)(1),
(2) Date: Feb. 28, 2017

(87) PCT Pub. No.: WO2016/060758
PCT Pub. Date: Apr. 21, 2016

(65) Prior Publication Data
US 2017/0247499 A1    Aug. 31, 2017

Related U.S. Application Data

(60) Provisional application No. 62/049,806, filed on Sep. 12, 2014.

(51) Int. Cl.
C08G 59/20 (2006.01)
C08G 59/22 (2006.01)
C08G 59/24 (2006.01)
C08G 59/28 (2006.01)
C08G 59/32 (2006.01)
C08G 59/50 (2006.01)
C08L 63/00 (2006.01)
C08L 63/02 (2006.01)
C08L 63/04 (2006.01)
C08G 59/14 (2006.01)
C08G 59/06 (2006.01)
C08K 3/00 (2018.01)
C09D 163/00 (2006.01)
C11C 3/00 (2006.01)
C08K 3/013 (2018.01)

(52) U.S. Cl.
CPC .......... *C08G 59/145* (2013.01); *C08G 59/06* (2013.01); *C08G 59/20* (2013.01); *C08G 59/50* (2013.01); *C08K 3/00* (2013.01); *C08K 3/013* (2018.01); *C08L 63/00* (2013.01); *C09D 163/00* (2013.01); *C11C 3/00* (2013.01)

(58) Field of Classification Search
None
See application file for complete search history.

(56) References Cited

U.S. PATENT DOCUMENTS

| | | | |
|---|---|---|---|
| 2,682,514 A | 6/1954 | Newey | |
| 2,682,515 A | 6/1954 | Naps | |
| 4,040,994 A | 8/1977 | Lewis et al. | |
| 5,973,082 A | 10/1999 | Elmore | |
| 6,037,392 A | 3/2000 | Tang et al. | |
| 6,057,375 A | 5/2000 | Wollenweber et al. | |
| 6,121,398 A | 9/2000 | Wool et al. | |
| 6,825,242 B2 | 11/2004 | Sulzbach et al. | |
| 8,084,631 B2 * | 12/2011 | Roh | C08G 18/36 549/513 |

(Continued)

FOREIGN PATENT DOCUMENTS

| | | | | |
|---|---|---|---|---|
| GB | 2428678 A | 2/2007 | | |
| JP | 62121721 A * | 6/1987 | ............. | C08G 59/20 |

(Continued)

OTHER PUBLICATIONS

Machine translation of JP-62121721-A (no date).*
Pham, S., et al., "Toughening of Vinyl Ester Resins with Modified Polybutadienes," Polymer, 1995, vol. 36, No. 17, pp. 3279-3285.
Thielemans, W., et al., "Novel Applications of Lignin in Composite Materials," Journal of Applied Polymer Science, 2002, vol. 83, pp. 323-331.

(Continued)

*Primary Examiner* — Michael J Feely
(74) *Attorney, Agent, or Firm* — Mendelsohn Dunleavy, P.C.

(57) ABSTRACT

Grafted triglycerides comprising a triglyceride grafted with a fatty acid residue containing 4 to 30 carbon atoms are reacted with an epoxide resin and an amine curing agent to yield an epoxy thermoset. The grafted triglyceride is prepared by reaction of an epoxidized triglyceride with a fatty acid. By varying the length of the fatty residue, the number of fatty residues per triglyceride, the identity of the epoxy resin and the amine curing agent, it is possible to prepare epoxy thermosets that exhibit superior physical properties compared to the properties of epoxy thermosets prepared without the grafted triglyceride, or as compared to epoxy thermosets wherein the epoxidized triglyceride is used in place of the grafted triglyceride.

19 Claims, 4 Drawing Sheets

(56) References Cited

U.S. PATENT DOCUMENTS

| | | | |
|---|---|---|---|
| 8,308,975 B2* | 11/2012 | Roh | C08G 18/36 252/182.24 |
| 8,785,547 B2 | 7/2014 | Palmese et al. | |
| 9,102,807 B2* | 8/2015 | Palmese | C08L 67/06 |
| 9,394,427 B2* | 7/2016 | Palmese | C08L 67/06 |
| 2003/0139489 A1 | 7/2003 | Sulzbach et al. | |
| 2007/0072106 A1 | 3/2007 | Hong et al. | |
| 2009/0275715 A1 | 11/2009 | Boyles et al. | |
| 2009/0294057 A1 | 12/2009 | Liang et al. | |
| 2013/0253127 A1 | 9/2013 | Palmese et al. | |
| 2014/0031570 A1* | 1/2014 | Kauffman | C09F 7/00 554/121 |
| 2014/0316055 A1* | 10/2014 | Palmese | C08L 67/06 524/558 |
| 2015/0361247 A1* | 12/2015 | Palmese | C08L 67/06 524/114 |

FOREIGN PATENT DOCUMENTS

| | | | |
|---|---|---|---|
| JP | 06-145691 A | 5/1994 | |
| JP | 11-510729 A | 9/1999 | |
| WO | WO9422954 A1 | 3/1993 | |
| WO | WO9743339 A1 | 5/1996 | |
| WO | WO2005097893 A1 | 10/2005 | |
| WO | WO2009069116 A2 | 6/2009 | |
| WO | WO-2012074675 A2 * | 6/2012 | C08L 67/06 |
| WO | WO 2013084707 A1 | 6/2013 | |
| WO | WO2013124574 A2 | 8/2013 | |
| WO | WO2014064200 A2 | 5/2014 | |
| WO | WO 2015034864 A1 | 3/2015 | |

OTHER PUBLICATIONS

Lu, J., et al., "New Sheet Molding Compound Resins From Soybean Oil I. Systhesis and Characterization," Polymer, vol. 46, 2005, pp. 71-80.

Lathi, P. S., et al., "Green Approach for the Preparation of Biodegradable Lubricant Base Stock from Epoxidized Vegetable Oil," Applied Catalysis B: Envronmental, vol. 69, 2007, pp. 207-212.

Demertzis, P.G., et al., "Gas Chromatographic Studies on Polymer-Plasticizer Compatibility: Interactions Between Food-Grade PVC and Epoxidized Soybean Oil," Eur. Polym. J., 1991, vol. 27, No. 3, pp. 231-235.

Liu, P., et al., "Hydroxylbenzylthioethers As Novel Organic Thermal Stabilizers for Rigid PVC," Polymer Degradation and Stability, 2007, vol. 92, pp. 503-508.

Park, S.J., et al., "Thermal and Mechanical Properties of Tetrafunctional Epoxy Resin Toughened with Epoxidized Soybean Oil," Material Science and Engineering A, 2004, vol. 374, pp. 109-114.

Ratna, D., et al., "Epoxidized Soybean Oil Toughened Epoxy Adhesive," Journal of Adhesion Science and Technology, 2000, vol. 14, No. 1, pp. 15-25.

Miyagawa, H., et al., "Fracture Toughness and Impact Strength of Anhydride-Cured Biobased Epoxy," Polymer Engineering and Science, 2005, vol. 45, No. 4, pp. 487-495.

Frischinger, Isabelle, and Stoil Dirlikov. "Toughening of epoxy resins by epoxidized soybean oil." 1993. 451-489.

La Scala, John J., et al. "Fatty acid-based monomers as styrene replacements for liquid molding resins." Polymer 45.22 (2004): 7729-7737.

La Scala, John J., et al. "The use of bimodal blends of vinyl ester monomers to improve resin processing and toughen polymer properties." Polymer 46.9 (2005): 2908-2921.

Peterson, Amy M., Robert E. Jensen, and Giuseppe R. Palmese. "Thermoreversible and remendable glass-polymer Interface for fiber-reinforced composites." Composites Science and Technology 71.5 (2011): 586-592.

Liang, Y., et al. "Toughening vinyl ester networks with polypropylene meso-fibers: interface modification and composit properties." Polymer 52.2 (2011): 510-518.

Peterson, Amy M., et al. "Investigation of interpenetrating polymer networks for self-healing applications." Composites Science and Technology 72.2 (2012): 330-336.

Wang, Rongpeng, and Thomas P. Schuman. "Vegetable oil-derived epoxy monomers and polymer blends: a comparative study with review." eXPRESS Polym. Lett 7.3 (2013): 272-292.

Teramoto, Naozumi. "Synthetic Green Polymers from Renewable Monomers." A Handbook of Applied Biopolymer Technology. 2011. 22-78.

European Search Report; dated Mar. 12, 2018 for EP Application No. EP15850875.4.

Liu, Z., et al., "Solid freeform fabrication of soybean oil-based composites reinforced with clay and fibers." Journal of the American Oil Chemists' Society 81.6 (2004): 605-610.

Australian Examination Report; dated Aug. 23, 2018 for AU Application No. 2015334010.

Liu, Zengshe, Sevim Z. Erhan, and Paul D. Calvert. "Solid freeform fabrication of soybean oil-based composites reinforced with clay and fibers." Journal of the American Oil Chemists' Society 81.6 (2004): 605-610.

Notice of Reasons for Rejection for Japanese Patent Application No. 2017-533717; dated Jun. 18, 2019.

* cited by examiner

TOUGHENING OF EPOXY THERMOSETS

This invention was made with government support under a contract that is a cooperative agreement, No. W911NF-06-2-0013, awarded by the U.S. Department of the Army. The government has certain rights in the invention.

FIELD OF THE INVENTION

The present invention is directed to epoxy thermoset polymer toughening agents and to epoxy resins toughened using these toughening agents.

DESCRIPTION OF RELATED TECHNOLOGY

Epoxy resin is a popular resin system that is used in thermoset polymer matrix composite fabrication for construction, industrial, military and commercial applications due to its desirable properties, low weight and low cost. The basic epoxy resin composition is the diglycidyl ether of a dihydric phenol, the most important of which from a commercial viewpoint is the diglycidyl ether of p,p'-dihydroxydiphenyl propane (Bisphenol A). Such diglycidyl ethers can be converted into thermoset compositions by a wide variety of curing agents, or can be converted into higher molecular weight epoxy resins by reaction with additional polyhydric phenol.

Blends of polyglycidyl ethers of polyhydric phenols with epoxidized fatty acid esters, e.g., epoxidized linseed oil, are described in U.S. Pat. No. 2,628,514. Adhesive compositions made from blends of liquid polyglycidyl ethers of dihydric phenols, solid polyglycidyl ethers of dihydric phenols and epoxidized fatty acid esters are described in U.S. Pat. No. 2,682,515.

Triglycerides are found in oils, such as soybean oil, linseed oil, etc. Soybean oil, as an example, is a renewable resource which contains different kinds of unsaturated fatty acids and saturated fatty acids with varying carbon chain lengths. Three unsaturated fatty acids with varying functionalities are connected by a glycerol center. The major unsaturated fatty acids in soybean oil triglycerides are the poly-unsaturates, comprising about 7 to 10% tri-unsaturated $C_{18}$ alpha-linolenic acid, 51% di-unsaturated $C_{18}$ linoleic acid, and 23% mono-unsaturated $C_{18}$ oleic acid. On average, there are about 4.6 double bonds per triglyceride.

Epoxidized soybean oil (ESO) is a type of functionalized triglyceride. ESO has been used as a composite (W. Thielemans et al., *Journal of Applied Polymer Science*, 2002, vol. 83, pp 323-331 and J. Lu et al., *Polymer*, 2005, 46:71-80), a lubricant, a plasticizer, and a thermal stabilizer (P. S. Lathi, *Applied Catalysis B: Environmental*, 2007, vol. 69, pp 207-212, P. G. Demertzis et al., *European Polymer Journal*, 1991, vol. 27, iss. 3, pp 231-235 and P. Liu et al., *Polymer Degradation and Stability*, 2007, vol. 92, pp 503-508). Using ESO to toughen epoxy resins is also known. See for example S. J. Park et al., *Materials Science and Engineering A*, 2004, vol. 374, pp 109-114, D. Ratna *Journal of Adhesion Science and Technology*, 2000, vol. 14, iss. 1, pp 15-25 and H. Miyagawa et al., *Polymer Engineering and Science*, 2005, vol. 45, iss. 4, pp 487-495.

U.S. Pat. No. 6,121,398 discloses high modulus polymers and composites that are derived from plant oils. This patent includes an extensive discussion of the various types and uses of triglycerides obtained from natural sources such as plant oils. This patent discloses functionalized triglycerides that are polymerizable and their use to produce high modulus polymers. The functionalized triglycerides may be produced via a number of different chemical synthesis routes. For example, epoxidized triglycerides may be produced and converted to resilient rubbers by control of their molecular weight and cross-link density. The resultant rubbers can be used as rubber toughening agents in rigid composites. Other functionalized triglycerides are described in U.S. Pat. No. 6,825,242, US 2003/0139489 and US 2009/0275715.

U.S. Pat. No. 8,785,547 discloses grafted triglycerides comprising an acrylated triglyceride grafted with a fatty acid residue containing 4 to 28 carbon atoms, and methods for making a grafted triglyceride and for curing a material selected from vinyl esters and unsaturated polyesters and mixtures thereof. The method includes the steps of mixing a grafted triglyceride with a material selected from vinyl esters, unsaturated polyesters and mixtures thereof to form a mixture, and curing the mixture to form a cured resin system. The cured resin system comprising the cured product obtained by the foregoing method and composites containing the cured product and a filler or reinforcing material are also disclosed. The grafted triglycerides are used to make toughened resin and composite systems with reduced hazardous air pollutants without significantly reducing the glass transition temperature or significantly increasing the viscosity of the curable mixture.

A need exists for a new type of epoxy thermoset that has improved physical properties, such as increased toughness.

SUMMARY OF THE INVENTION

In a first aspect, the present invention relates to an epoxy thermoset prepared by a reaction of: (a) a grafted triglyceride prepared by a reaction of an epoxidized triglyceride with a fatty acid, wherein the fatty acid contains from about 4 to about 30 carbon atoms; (b) an epoxy resin; and (c) an amine curing agent, wherein the weight ratio of the triglyceride to the epoxy resin is in the range of 1:99 to 99:1.

In a second aspect, the present invention relates to the above-described epoxy thermoset, wherein a molar ratio of the fatty acid to the epoxidized triglyceride is from about 0.1:1 to about 4:1.

In a third aspect, the present invention relates to the above-described epoxy thermoset, wherein a molar ratio of the fatty acid to the epoxidized triglyceride is from about 1:1 to about 3.5:1.

In a fourth aspect, the present invention relates to the above-described epoxy thermoset, wherein a molar ratio of the fatty acid to the epoxidized triglyceride is from about 2:1 to about 3:1.

In a fifth aspect, the present invention relates to the above-described epoxy thermoset, wherein the grafted triglyceride has a molecular weight of from about 990 g/mole to about 3280 g/mole.

In a sixth aspect, the present invention relates to the above-described epoxy thermoset, wherein the grafted triglyceride has a molecular weight of from about 1200 g/mole to about 2000 g/mole.

In a seventh aspect, the present invention relates to the above-described epoxy thermoset, wherein the triglyceride is obtained from a material selected from a plant oil, an animal oil, an algae oil, and a mixture thereof.

In an eighth aspect, the present invention relates to the above-described epoxy thermoset, wherein the grafted triglyceride comprises one or more epoxy groups.

In a ninth aspect, the present invention relates to the above-described epoxy thermoset, wherein the epoxy resin is selected from bisphenol A epoxy resin, bisphenol F epoxy resin, novolac epoxy resin, an aliphatic epoxy resin, and a glycidylamine epoxy resin.

In a tenth aspect, the present invention relates to the above-described epoxy thermoset, wherein the epoxy resin is a bisphenol-A diglycidyl ether epoxy resin monomer or an oligomer thereof.

In an eleventh aspect, the present invention relates to the above-described epoxy thermoset, wherein the fatty acid is selected from n-hexanoic acid, n-octanoic acid, n-decanoic acid, n-dodecanoic acid, lauric acid, n-tetradecanoic acid, myristic acid, n-hexadecanoic acid, palmitic acid, stearic acid, oleic acid, linoleic acid, linolenic acid, arachidic acid, gadoleic acid, behenic acid and erucic acid.

In a twelfth aspect, the present invention relates to the above-described epoxy thermoset, wherein the weight ratio of the triglyceride to the epoxy resin is in the range of 1:99 to 30:70.

In a thirteenth aspect, the present invention relates to the above-described epoxy thermoset, wherein the fatty acid contains 5 to 20 carbon atoms per molecule.

In a fourteenth aspect, the present invention relates to the above-described epoxy thermoset, wherein the fatty acid contains 6 to 16 carbon atoms per molecule.

In a fifteenth aspect, the present invention relates to the above-described epoxy thermoset, wherein a 5 millimeter thick sample of the epoxy thermoset is translucent to the naked eye.

In a sixteenth aspect, the present invention relates to an epoxy thermoset prepared by reaction of: a grafted triglyceride prepared by a reaction of an epoxidized triglyceride with a fatty acid, wherein the fatty acid contains from about 4 to about 30 carbon atoms per molecule; and an amine curing agent.

In a seventeenth aspect, the present invention relates to a composite comprising at least one of the above-described epoxy thermosets.

In an eighteenth aspect, the present invention relates to the above-described composite comprising one or more materials selected from fibers, reinforcing materials, clays, silicates, fillers and whiskers.

In a nineteenth aspect, the present invention relates to a composite comprising one or more additives selected from colorants, pigments, carbon black, impact modifiers, antioxidants, stabilizers, flame retardants, reheating aids, crystallization aids, oxygen scavengers, plasticizers, flexibilizers, nucleating agents, foaming agents, and mold release agents.

In a twentieth aspect, the present invention relates to a grafted triglyceride prepared by a reaction of an epoxidized triglyceride with a fatty acid, wherein the fatty acid contains from about 4 to about 30 carbon atoms per molecule.

The grafted triglyceride may be prepared by reacting an epoxidized triglyceride with a fatty acid or a mixture of fatty acids. The grafted triglycerides of the present invention comprise triglycerides that are modified to fine tune the molecular weight of the triglyceride, and to adjust the reactivity of the triglycerides with the one or more fatty acids.

The epoxidized triglyceride is reacted with a fatty acid or a mixture of fatty acids. The fatty acids of the present invention are hydrocarbons that terminate in a —C(O)—OH group. The hydrocarbon may be a linear chain, or a branched chain. The hydrocarbon contains about 4 to about 30 carbon atoms or from about 5 to about 22 carbon atoms, or, from about 6 to about 16 carbon atoms. The hydrocarbon chain may be fully saturated, or it may be partially unsaturated.

Examples of fully saturated hydrocarbon fatty acids include n-hexanoic acid, n-octanoic acid, n-decanoic acid, n-dodecanoic acid, lauric acid, n-tetradecanoic acid, myristic acid, n-hexadecanoic acid and palmitic acid.

The epoxidized triglyceride is reacted with a fatty acid or a mixture of fatty acids to generate a grafted triglyceride. Any reaction conditions may be used to generate the grafted triglyceride, as long as such conditions cause the epoxy groups on the epoxidized triglyceride to react with the carboxylic acid group on the fatty acids. The grafted triglyceride may be prepared via a one-batch synthesis, wherein the epoxidized triglyceride is reacted with the fatty acid. The molar ratio of the fatty acid to the epoxidized triglyceride is from about >0:1 to about 4:1, or from about 1:1 to about 3.5:1, or from about 2:1 to about 3:1.

Aside from the grafted triglyceride and the epoxy resin, the reaction used to form the epoxy thermoset also involves at least one amine curing agent. Suitable curing agents for epoxies are well known in the industry. Exemplary curing agents include aliphatic polyamines such as diethylenetriamine, DTA, triethylenetetramine, TTA, tetraethylenepentamine, TEPA, diproprenediamine, DPDA, dimethylaminopropylamine, DEAPA; alicyclic polyamines such as N-aminoethylpiperazine, N-AEP, menthane diamine, MDA, isophoronediamine, IPDA; aliphatic aromatic amines such as m-xylenediamine, m-XDA; aromatic amines such as metaphenylene diamine, MPDA, diaminodiphenylmethane, DDM, diaminodiphenylsulfone, DDS; and mixtures thereof. Further examples of suitable curing agent include EPI-KURE® Curing Agent W, Amicure® PACM, and bis-(paminocyclohexyl)methane.

In another aspect, the present invention relates to composites comprising the epoxy thermoset described above. Such composites are formed from the cured resin system described above and may contain additional additives such as fibers, clays, silicates, fillers, whiskers or other conventional filler or reinforcing materials. Typical fibers used for such composites include, but are not limited to, E-glass, S-glass, Kevlar®, carbon fiber, and ultra-high molecular weight polyethylene. Additional additives that may be employed in conventional amounts and may be added directly to the process during formation of the composite. Such additional additives may include, for example, colorants, pigments, carbon black, fibers such as glass fibers, carbon fibers and aramid fibers, fillers, impact modifiers, antioxidants, stabilizers, flame retardants, reheating aids, crystallization aids, oxygen scavengers, plasticizers, flexibilizers, nucleating agents, foaming agents, mold release agents, and combinations thereof.

BRIEF DESCRIPTION OF THE DRAWINGS

FIG. 1(A) shows a thermoset prepared from a 15:85 weight ratio of epoxidized soybean oil and EPON 828. FIG. 1(B) shows a thermoset prepared from a 15:15:70 weight ratio of epoxidized soybean oil, EPON 1001F, and EPON 828.

DETAILED DESCRIPTION OF THE INVENTION

Figure 1A:
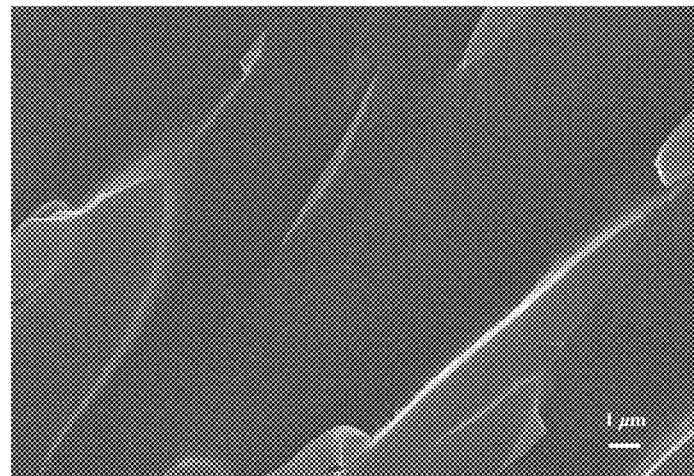
FIGS. 1(A)-1(B) show thermosets prepared by a reaction of epoxidized triglyceride, epoxy resin and an amine curing agent. For both thermosets, the amine curing agent was PACM used in a stoichiometric amount.
Figure 1B:
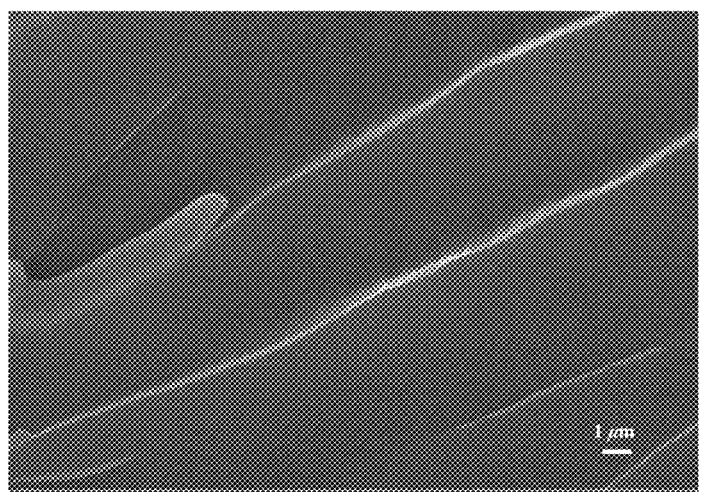
Figure 2A:
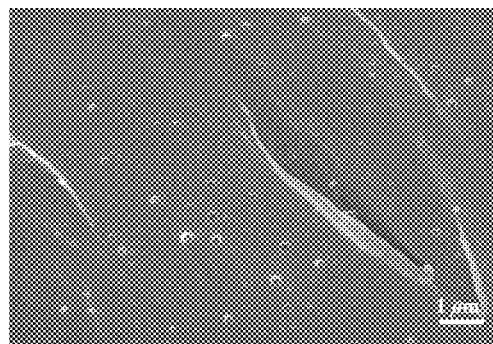
FIGS. 2(A)-2(D) show a thermoset prepared by a reaction of a grafted triglyceride, an epoxy resin and an amine curing agent. The epoxy resin was EPON 828, the amine curing agent was PACM and was used in a stoichiometric amount. The thermoset shown in FIG. 2(A) comprised 10 parts by weight triglyceride grafted with 3 equivalents of hexanoic acid ("HEX-3"). The thermoset shown in FIG. 2(B) comprised 15 parts by weight HEX-3. The thermoset shown in FIG. 2(C) comprised 10 parts by weight triglyceride grafted with 3 equivalents of octanoic acid ("OCT-3"), and the thermoset shown in FIG. 2(D) comprised 15 parts by weight OCT-3.
Figure 2B:
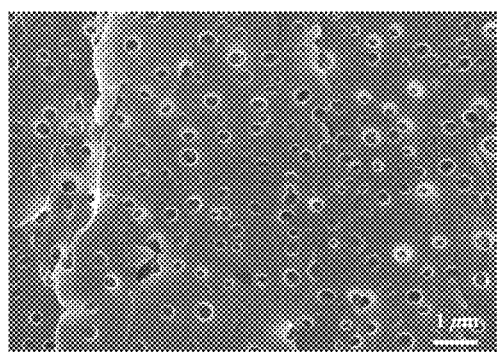
Figure 2C:
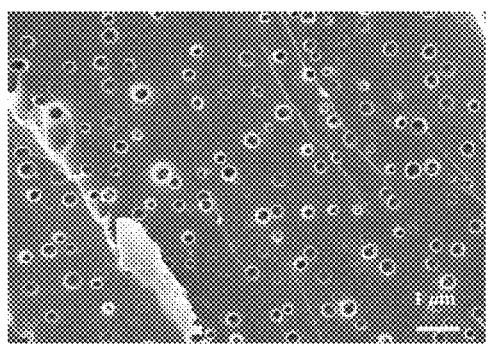
Figure 2D:
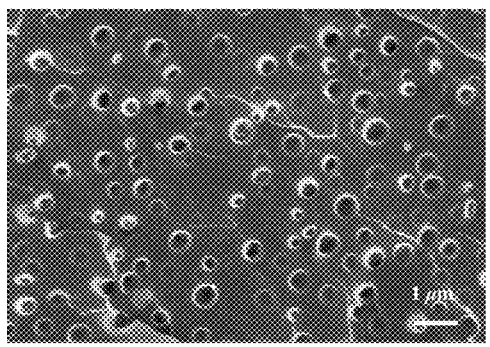
Figure 3A:
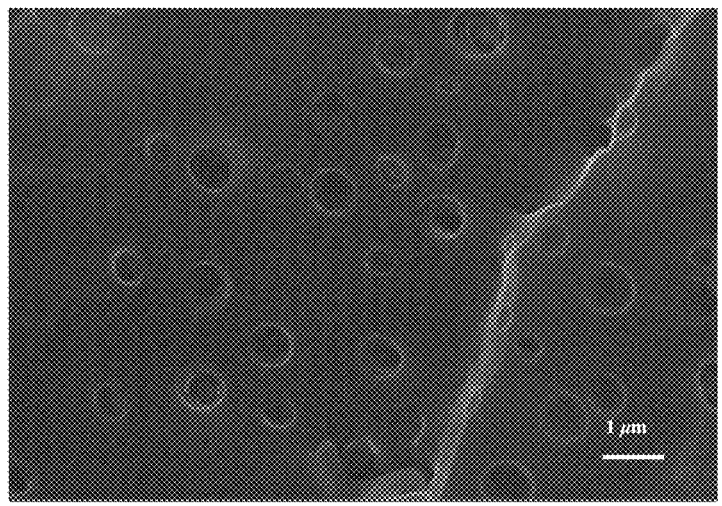
FIGS. 3(A)-3(B) show a thermoset prepared by a reaction of a grafted triglyceride, an epoxy resin consisting of mixture of 15 parts by weight of EPON 1001F and 70 parts by weight of EPON 828, and PACM amine curing agent used in a stoichiometric amount. The grafted triglyceride was used in an amount to provide 15 wt. % of the theremoset. The grafted triglyceride in the thermoset shown in FIG. 3(A) was HEX-3, and the grafted triglyceride in the thermoset shown in FIG. 3(B) was OCT-3.
Figure 3B:
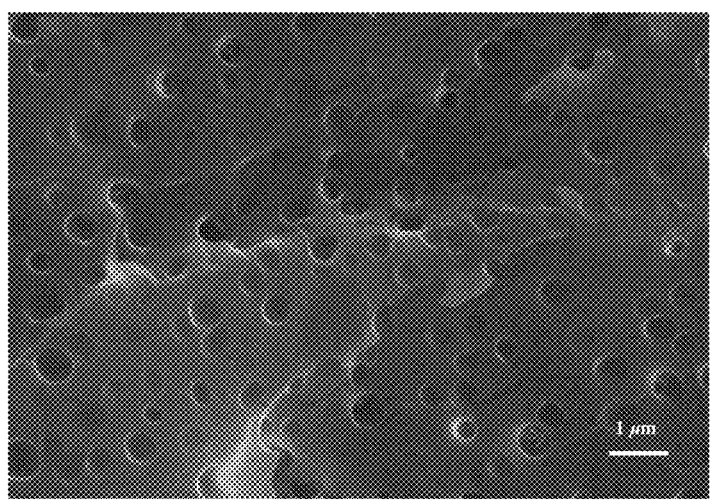

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

As used herein and in the appended claims, the singular forms "a", "an", and "the" include plural references unless the context clearly dictates otherwise. The terms "a" (or "an"), "one or more" and "at least one" can be used interchangeably herein. It is also to be noted that the terms "comprising", "including", and "having" can be used interchangeably.

The present invention relates to a thermoset polymer composition and to a process for preparing such a composition. The thermoset polymer composition contains a reaction product of one or more epoxy resins, one or more grafted triglycerides, and one or more amine curing agents. Such a thermoset polymer composition may exhibit properties that are superior to the properties of similar thermosets that do not include a grafted triglyceride in the reaction mixture.

In one aspect of the present invention, the epoxy thermoset is prepared by a reaction of: (a) a grafted triglyceride, which is itself prepared by a reaction of an epoxidized triglyceride with a fatty acid, wherein the fatty acid contains from about 4 to about 30 carbon atoms, (b) an epoxy resin, and (c), an amine curing agent, wherein the weight ratio of the grafted triglyceride to the epoxy resin is in the range of 1:99 to 30:70.

[Grafted Triglyceride]

The grafted triglyceride is prepared by reacting an epoxidized triglyceride with a fatty acid or a mixture of fatty acids. The grafted triglycerides of the present invention may include triglycerides that are modified to fine tune the molecular weight of the triglyceride, and/or to adjust the reactivity of the triglycerides with the epoxide resin.

[Triglyceride]

Triglycerides are a combination of triesters of fatty acids linked together by a glycerol. The fatty acid residues are derived from linear carboxylic acids containing from about 4 to about 30 carbon atoms, or from about 5 to about 22 carbon atoms, or, from about 6 to about 16 carbon atoms. At least one of the fatty acid residues that are part of the triglyceride contains unsaturation in the form of at least one carbon-carbon double bond. Not every one of the fatty residues bound to the glycerol needs to have a carbon-carbon double bond. Each triglyceride must contain at least one carbon-carbon double bond and may contain up to about 12 carbon-carbon double bonds. Typically, fatty acid residues having carbon-carbon double bonds will contain from about 1 to 4 carbon-carbon double bonds per residue.

The triglycerides of the present invention may be derived from plant and animal oil sources, for example, lard, rapeseed oil, palm oil, beef tallow, fish oil, soy bean oil, canola oil, sunflower oil, safflower oil, rice bran, corn oil, peanut oil, cottonseed oil, castor oil, linseed oil and colza oil. These triglycerides include a number of reactive sites for functionalization such as the double bond in triglycerides containing unsaturated groups, allylic carbons, ester groups and the carbons in the alpha position relative to an ester group. The present invention introduces functionality to the triglycerides at one or more of these reactive sites in order to introduce polymerizable groups onto the triglycerides and modify the molecular weight of the triglycerides.

[Epoxidized Triglyceride]

Triglycerides may be converted to epoxidized triglycerides in any conventional manner such as by reaction with hydrogen peroxide. The resultant epoxy groups on the triglycerides can be employed as reactive sites for further modification of the epoxidized triglycerides. The number of double bonds in the triglycerides which are converted to epoxy groups may be controlled during the epoxidation reaction in a suitable, conventional manner, if it is desired to retain some of the double bonds in the epoxidized triglyceride or to control the degree of epoxidation. The degree of epoxidation of the triglyceride may also be influenced by selection of the starting triglyceride based on the number of unsaturated groups contained therein.

An exemplary structure of an epoxidized triglyceride is:

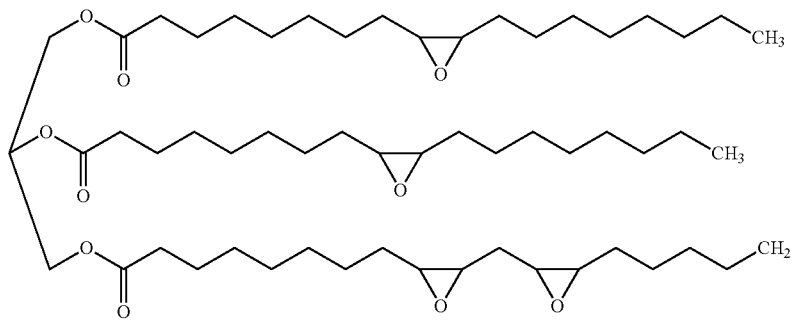 [SMILES: CCCCCCCCC1OC1CCCCCCCC(=O)OCC(COC(=O)CCCCCCCC1OC1CC1OC1CCCCC)OC(=O)CCCCCCCC1OC1CCCCCCCC]

[Fatty Acid]

The epoxidized triglyceride is reacted with a fatty acid or a mixture of fatty acids. The fatty acids of the present invention are hydrocarbons that terminate in a —C(O)—OH group. The hydrocarbon may be a linear chain, or a branched chain. The hydrocarbon contains about 4 to about 20 carbon atoms. The hydrocarbon chain may be fully saturated, or it may be partially unsaturated. Examples of fully saturated hydrocarbon fatty acids include n-hexanoic acid, n-octanoic acid, n-decanoic acid, n-dodecanoic acid, lauric acid, n-tetradecanoic acid, myristic acid, n-hexadecanoic acid and palmitic acid.

The fatty acids may be derived a petroleum source, or from a biological source such as triglycerides. Examples of the fatty acids derived from triglycerides include, but are not limited to, lauric acid, myristic acid, stearic acid, oleic acid, linoleic acid, linolenic acid, arachidic acid, gadoleic acid, behenic acid and erucic acid. Thus, triglycerides in accordance with the invention may contain one or more residues of each of the foregoing fatty acids, other fatty acids or mixtures thereof. Typical plant oil triglycerides used in the present invention contain about 10-20% saturated, about 20-30% mono-unsaturated, about 40-60% di-unsaturated and about 5-15% tri-unsaturated fatty acid residues, but other distributions of fatty acid residues can be employed within the scope of the invention.

[Grafted Triglycerides]

The epoxidized triglyceride is reacted with a fatty acid or a mixture of fatty acids to generate a grafted triglyceride. Any reaction conditions may be used to generate the grafted triglyceride, as long as such conditions cause the epoxy groups on the epoxidized triglyceride react with the carboxylic acid group on the fatty acids. The grafted triglyceride may be prepared via a one-batch synthesis, wherein the epoxidized triglyceride is reacted with the fatty acid. The molar ratio of the fatty acid to the epoxidized triglyceride is from >about 0:1 to about 4:1, or about 1:1 to about 3.5:1, or about 2:1 to about 3:1.

The reaction to prepare the grafted triglyceride may include additional ingredients beyond the epoxidized triglyceride and fatty acid. For example, the reaction may be performed in the presence of one or more catalysts. Such catalysts include trivalent organic chromium complexes, phthalate esters, hydroquinone, and other suitable catalysts known to skilled person. Further, the reaction may be performed in an inert solvent, or it may be performed without a solvent.

The reaction mixture is heated to a temperature to assure an essentially complete reaction. For example the reaction may be performed at a temperature in a range of from about 70° C. to about 90° C. for 1 to 6 hours. The reaction may be performed in a container in an oven, a Schlenk apparatus heated with an oil bath or a resistive heated mantel, or in a closed reaction vessel on a pilot or production plant.

The progress of the reaction may be monitored by acid number titration. In one embodiment, the reaction to produce the grafted triglyceride is carried out until the acid number of the reaction product is below a certain threshold, such as 10. In one embodiment of the present invention the threshold value is 5. It is believed that residual acid in the grafted triglyceride may have, in some cases, an adverse effect on the cured resin system and thus in such cases it is desirable to ensure that the grafted triglyceride has a low residual acid content. Other suitable conventional methods of monitoring the reaction known to a skilled person may also be used to ensure a low residual acid content in the grafted triglyceride including, for example, purification, neutralization, etc.

Grafting of the fatty acids onto the epoxidized triglyceride may be carried out under controlled conditions and/or using suitable amounts of reactants to react from 10-100% of the residual reactive epoxy groups on the epoxidized triglyceride with fatty acid, more preferably 30 to 80% of the epoxy groups are reacted, and most preferably, 50 to 70% of the epoxy groups are reacted. In this manner, it is possible to retain some residual epoxy groups on the grafted triglyceride for further customization of the grafted triglyceride. Residual epoxy groups are then used in the further reaction with the epoxide resin and cured with an amine curing agent.

An exemplary structure of a grafted triglyceride is:

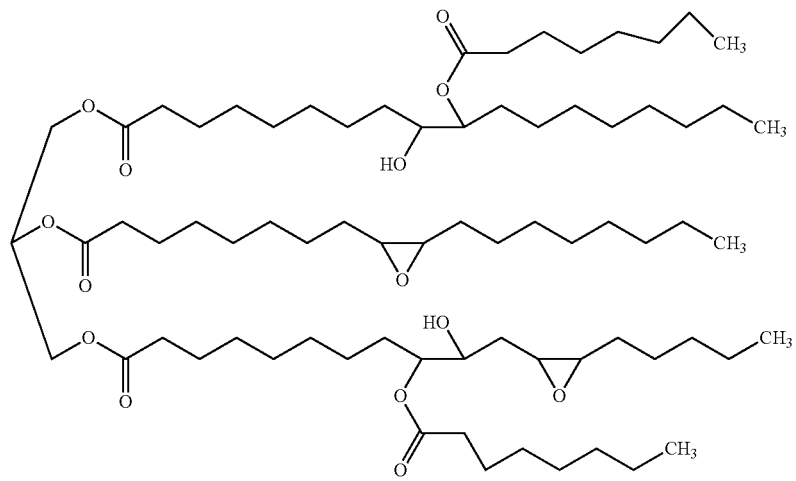 [SMILES: CCCCCCCCC(OC(=O)CCCCCCC)C(O)CCCCCCCC(=O)OCC(COC(=O)CCCCCCCC(OC(=O)CCCCCCC)C(O)CC1OC1CCCCC)OC(=O)CCCCCCCC1OC1CCCCCCCC]

The compound having this exemplary structure may be obtained by reacting two equivalents of n-octanoic acid with an epoxidized triglyceride. Such a reaction would also produce a wide statistical distribution of other compounds, such as compounds where the octanoic residues are on different sites, or compounds that have one, three or four octanoic residues.

Grafted triglycerides may alternatively be prepared from hydroxylated triglycerides or hydroxylated and epoxidized triglycerides. Hydroxylated triglycerides include naturally occurring oils, such as castor oil, as well as synthetic oils. In one embodiment of the present invention, hydroxyl groups can be reacted with one or more of the fatty acids. Triglycerides that contain both hydroxyl and epoxide groups can be prepared as described elsewhere, and could be prepared from naturally hydroxylated oils, such as castor oil, naturally epoxidized oils, such as *vernonia* oil, or more common plant oils, such as soy bean oil and linseed oil.

The grafting of one of more fatty acid groups onto the triglycerides serves several important functions which are used to tailor the triglyceride for toughening of various epoxy thermosets. Firstly, the fatty acid groups increase the molecular weight of the triglycerides. Secondly, the fatty acids reduce the polarity of the triglycerides. Both the molecular weight and the polarity of the triglycerides may be important since these properties determine whether the triglycerides phase separate from the epoxide resin used to make the epoxy thermoset of the present invention. The phase separation of the grafted triglycerides from the epoxide polymer is desirable since it may provide enhanced toughening of the epoxide thermoset. In this manner, a spectrum of tougheners having varying molecular weights, sizes, and relative activities have been formulated so that an appropriate toughener can be selected from this spectrum for use in a particular epoxy resin system.

The tailoring of the composition to exhibit the desired properties of the final epoxy thermoset may be performed by adjusting the molecular weights of the reactants and/or the reaction ratios of the fatty acid to the epoxidized triglyceride. Suitable molecular weights of the grafted triglycerides may vary over a wide range, depending primarily on the identity of the epoxy resin. In one aspect, the molecular weight of the grafted triglyceride is tuned to substantially match the molecular weight of the epoxy resin in order to form a miscible system for curing, e.g. the molecular weight of the grafted triglyceride is within about 2000 g/mole of the molecular weight of the resin to be cured, more preferably, within about 1000 g/mole and most preferably, within about 500 g/mole of the molecular weight of the resin to be cured. Suitable molecular weights for the grafted triglycerides are typically within a range of about 990 to about 3280 g/mole, preferably within the range of about 1200 to about 2000 g/mole and more preferably from about 1300 to about 1600 g/mole.

Although in one embodiment of the present invention the grafted triglyceride is a single compound, typically, the grafted triglyceride may be a mixture of a number of different compounds, each of which has a structure of a grafted triglyceride. Such a mixture typically contains a statistical distribution of compounds and may be obtained, for example, from natural products. For example, a reaction of two equivalents of fatty acid with a triglyceride yields a mixture of grafted triglycerides that contain a triglyceride compound with two fatty acid residues, and amounts of grafted triglycerides with one, three, four or more fatty acid residues.

[Epoxy Resin]

The grafted triglyceride is reacted with an epoxy resin and an amine curing agent to generate an epoxide thermoset. The epoxy resin which may be used to make the epoxy thermoset may be any commercially available epoxy resin. Epoxy resins are characterized by containing a 3-membered ring known as an epoxy, an epoxide, or an oxirane. Epoxy resins typically contain aliphatic, cycloaliphatic or aromatic backbones. Suitable epoxy resins include, but are not limited to bisphenol A epoxy resin, bisphenol F epoxy resin, novolac epoxy resins, aliphatic epoxy resins, glycidylamine epoxy resins, diglycidyl ether of bisphenol-A, epoxies of the phenol-novolac type and epoxies based on tetrabromobisphenol-A.

An example of an epoxy resin is a bisphenol-A diglycidyl ether epoxy resin ("DGEBA", or "BADGE") having the structure:

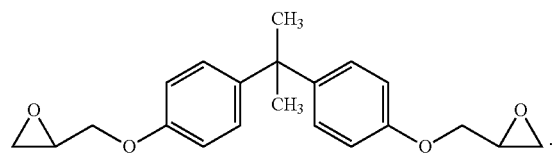 [SMILES: CC(C)(c1ccc(OCC2CO2)cc1)c1ccc(OCC2CO2)cc1]

Another example of an epoxy resin is an oligomer of foregoing molecule, having the chemical structure:

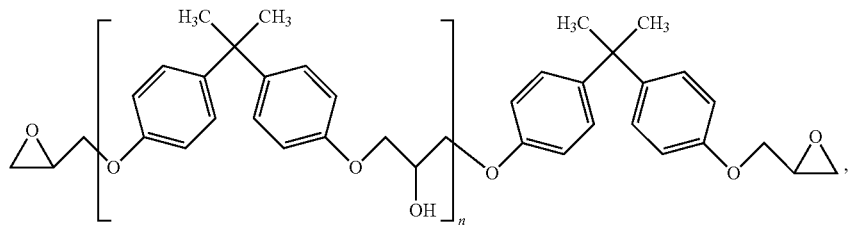

wherein n is a value between 0 and 25.

All of the resins mentioned above may be modified by methods known to skilled persons and still be used in the present invention. Suitable modifications include, but are not limited to, modifications to lower the acid, hydroxyl and/or anhydride number, or to increase flexibility, toughness, or increase the cross-link density of the resin, or to decrease flammability.

[Curing Agent]

Aside from the grafted triglyceride and the epoxy resin, the reaction used to form the epoxy thermoset also involves at least one amine curing agent. Suitable curing agents for epoxies are well known in the industry. Exemplary curing agents include aliphatic polyamines such as diethylenetriamine, DTA, triethylenetetramine, TTA, tetraethylenepentamine, TEPA, diproprenediamine, DPDA, dimethylaminopropylamine, DEAPA; alicyclic polyamines such as N-aminoethylpiperazine, N-AEP, menthane diamine, MDA, isophoronediamine, IPDA; aliphatic aromatic amines such as m-xylenediamine, m-XDA; aromatic amines such as metaphenylene diamine, MPDA, diaminodiphenylmethane, DDM, diaminodiphenylsulfone, DDS; and mixtures thereof.

Further examples of suitable curing agent include EPI-KURE® Curing Agent W, Amicure® PACM, and bis-(paminocyclohexyl)methane.

The grafted triglyceride makes up about 2 to about 30 wt % of the combination of the grafted triglyceride, resin, and the curing agent, more preferably about 5 to about 20 wt %, and most preferably, about 10 to about 15 wt %. The amount of grafted triglyceride may vary depending on a number of factors such as the type of resin, the type and amount of the amine curing agent, the type of grafted triglyceride, and the desired properties of the cured resin system. Factors such as the polarities and molecular weights of the grafted triglyceride and resin may also play a role in the selection of the amount of grafted triglyceride to be employed. Generally, an amount of grafted triglyceride is employed which exhibits a good miscibility with the resin and the amine curing agent when mixed, but that also sufficiently phase separates from the resin during curing to provide the desired toughening effect.

The experimental data given below shows that selected properties of epoxy thermosets can be significantly improved by reacting the epoxy resin with grafted triglycerides and amine curing agents, without sacrificing other key properties of the epoxy thermosets such as the glass transition temperature, viscosity and/or fracture toughness of composites made with the thermosets.

[Thermoset Preparation]

The preparation of the epoxy thermoset according to the present invention involves a reaction of: (a) a grafted triglyceride prepared by a reaction of an epoxidized triglyceride with a fatty acid, wherein the fatty acid contains from about 4 to about 30 carbon atoms per molecule; (b) an epoxy resin; and (c) an amine curing agent, wherein the weight ratio of the grafted triglyceride to the epoxy resin is in the range of about 1:99 to about 99:1.

The range of optimal ratios in the aforementioned range of about 1:99 to about 99:1 depends in a large part on the desired properties of the epoxy thermoset. For products wherein the epoxy thermoset is to have high toughness, the weight ratio of the grafted triglyceride to the epoxy resin may be in the range of about 5:95 to about 30:70. For several epoxy thermosets, the ideal range for the weight ratio of the grafted triglyceride to the epoxy resin appears to be 10:90 to 20:80. However, a desirable ratio of the grafted triglyceride to the epoxy resin ratio to provide a product that exhibits greater softness and/or is more rubbery, may be the in range of 50:50 to 80:20.

One method for the preparation of the epoxy thermoset is as follows. A blend of grafted triglyceride and epoxy resin in a specific weight ratio (for example 1:99, 10:90, 15:85, 20:80 and 30:70), may be mixed with the amine curing agent, and any other additive. These ingredients may be added in any order; the experiments below have shown that in the example investigated, preblending of the amine curing agent with the grafted triglyceride did not affect the properties of the final epoxy thermoset.

After mixing these ingredients to provide a substantially homogeneous mixture, energy may be introduced into the blend to advance the reaction. Such energy may be delivered via heating, radiation, and/or high energy mixing. The mixture may be then degassed in a vacuum, poured into one or more appropriate molds and cured at an elevated temperature for several minutes, or hours, or days to produce the epoxy thermoset. Optionally, the cured epoxy thermoset is post-cured at a higher temperature.

The provision of phase separated domains in the cured epoxy thermoset may be achieved by an appropriate selection of the reactants, ratios thereof and reaction conditions. The mean diameter of the phase separated domains may be less than 500 nm. The provision of phase separation in the form of these phase separated domains is believed to provide a toughened and transparent epoxy thermoset.

Phase separation can be evaluated by observation of light transmission through the epoxy thermoset. For example, a 5 millimeter thick sample of the epoxy thermoset that appears translucent typically has desirable structural properties. The thermoset is translucent if an ambient light, such as sunlight or indoor light typically used in working areas, is visible through the 5 millimeter sample coupon of the epoxy thermoset with a naked eye.

In applications where an opaque epoxy thermoset with improved toughness is desired, additional material(s) that would not materially affect the structural properties of the epoxy thermoset may be mixed into the reaction mixture to increase the opacity of the final epoxy thermoset product. Examples of such materials include carbon black, pigments, and colorants.

The prepared epoxy thermosets typically exhibit increased toughness. Toughness may be quantified as either a critical strain energy release rate ($G_{1c}$) and/or critical stress intensity factor ($K_{1c}$). These values may be obtained by routine techniques using a dynamic mechanical analysis apparatus as known by a person of ordinary skill in the art, such as ASTM D5045-99 and ISO-FDIS 13586-1. The critical stress intensity factor for the epoxy thermosets may be above 0.600 MPa·m$^{1/2}$, or above 0.800 MPa·m$^{1/2}$, or above 1.200 MPa·m$^{1/2}$, or above 2.000 MPa·m$^{1/2}$.

In another embodiment, the formation of the epoxide thermoset may be performed without the epoxy resin identified in subparagraph (b). The epoxide thermoset of this embodiment is prepared by reacting a grafted triglyceride and an amine curing agent. Such thermosets will typically exhibit soft and rubbery properties.

[Composites]

In another aspect, the present invention relates to composites comprising the epoxy thermoset described above. Such composites are formed from the cured resin system described above and may contain additives such as fibers, clays, silicates, fillers, whiskers or other conventional filler or reinforcing materials. Typical fibers used for such composites applications include but are not limited to E-glass, S-glass, Kevlar®, carbon fiber, and ultra-high molecular weight polyethylene. Additional additives that may be employed in conventional amounts and may be added directly to the process during formation of the composite, include colorants, pigments, carbon black, fibers such as glass fibers, carbon fibers and aramid fibers, fillers, impact modifiers, antioxidants, stabilizers, flame retardants, reheating aids, crystallization aids, oxygen scavengers, plasticizers, flexibilizers, nucleating agents, foaming agents, mold release agents, and combinations thereof.

The composites of the present invention may also include nano-materials dispersed in therein. A nano-material is any reinforcing material or mixture thereof, which has at least one dimension in the nanometer scale. Suitable nano-materials include, for example, nanoclays including, layered crystalline clays (such as natural or synthetic silicates like aluminum or aluminum-magnesium silicates), nano-fibers (such as cellulosic nano-fibers), nano-whiskers (such as cellulosic nano-whiskers), nanotubes (such as carbon or metal oxide nanotubes), nano-platelets (such as carbon nano-platelets), metallic oxides, metallic sulfides, metallic layered double hydroxides, or mixtures thereof.

Reinforcing materials may be treated with organophilic modifying compounds to enhance physical and chemical interaction between the reinforcing material and the resin. Organophilic modifying compounds are generally known in the art and include such interacting groups as, for example, amines, carboxylics, alcohols, phenols, silanes, organophilic ions, onium ions (ammonium, phosphonium, sulfonium and the like), etc.

The reinforcing material may be present in the nanocomposite in an amount that is suitable for imparting the desired effect of the reinforcing material without compromising other properties of the composite necessary for the application in which the composite is to be used. For example, the reinforcing material may be used to increase the fracture toughness of the composite, to modify the modulus of the composite and/or to modify the electrical conductivity of the composite. One skilled in the art can readily determine a suitable amount of reinforcing material.

The amount of reinforcing material in the composite may be from about 0.1 to about 75 weight percent based on the total weight of the composite, or from about 0.2 to about 30 weight percent, or from about 0.5 to about 20 weight percent, or from about 1 to about 10 weight percent. The amount of reinforcing material in particle filled (non-nano talc, silica, etc.) composites may be from about 0.1 to about 75 weight percent based on the total weight of the composite, or from about 0.2 to about 30 weight percent, or from about 1 to about 10 weight percent. The amount of reinforcing material in fiber reinforced composites may be from about 5 to about 90 weight percent based on the total weight of the composite, or from about 10 to about 80 weight percent, or from about 30 to about 75 weight percent.

EXPERIMENTAL

Materials.

Hydroquinone (99%), and all carboxylic acids, including n-hexanoic acid ($C_5H_{11}COOH$, "HEX", 99%), n-octanoic acid ($C_7H_{15}COOH$, "OCT", 99%), n-decanoic acid ($C_9H_{19}COOH$, "DEC", 99%), n-lauric acid ($C_{11}H_{23}COOH$, "LAU", 98+%), n-myristic acid ($C_{13}H_{27}COOH$, "MYR", 99%), and n-palmitic acid ($C_{15}H_{31}COOH$, "PAL", 99%), were obtained from Sigma-Aldrich, USA. AMC-2 catalyst (Aerojet Chemicals, Rancho Cordova, Calif.), is a mixture of 50% trivalent organic chromium complexes and 50% phthalate esters. Drapex 6.8 (Galata Chemicals, Southbury, Conn., USA) is an epoxidized soybean oil ("ESO", CAS 8013-07-8). EPON™ Resin 828 (Miller Stephenson, Danbury, Conn., USA; CAS 25068-38-6) is an undiluted clear difunctional bisphenol A/epichlorohydrin derived liquid epoxy resin DGEBPA with a weight of 185-192 g/epoxide. EPON™ Resin 1001F (Miller Stephenson) is a low molecular weight solid epoxy resin derived from a liquid epoxy resin and bisphenol-A, with a weight of 525-550 g/epoxide. EPIKURE® Curing Agent W is a non-MDA aromatic amine curing agent with a nitrogen content of 15.7 to 15.9 wt %, and amine hydrogen equivalent weight of about 45. Amicure® PACM ("PACM", Air Products & Chemicals, Inc. Allentown, Pa., USA) is bis-(p-aminocyclohexyl)methane, with amine hydrogen equivalent weight of about 52.5. All chemicals were used as received.

Epoxy Equivalent Weight Determination.

Experimental epoxy equivalent weight ("EEW") values of EPON 828, EPON 1001F, ESO and the prepared grafted triglycerides were determined by epoxy titration using ASTM D1652-97 procedure B. Theoretical EEW were calculated on the basis of molecular weights.

The EEW of EPON 828 and EPON 1001 were measured to be 188.0 (lit. 185-192), and 537.5 (lit. 525-550), respectively.

Table 2 shows the experimental and theoretical EEW, elution time from the GPC test and viscosity data from a rheometer for ESO and various grafted triglycerides. The composition formulation herein was based on experimental EEW data. Elution time data were assigned as the peak of the elution curve from the GPC test of these materials. Viscosity properties of these grafted triglycerides were measured by using a rheometer at a shear rate of 1000/s at RT.

TABLE 1

EEW, elution time and viscosity of materials used in this study

| | Experimental EEW[a] | | | Theoretical EEW[a] | | | Elution Time[b]/min | | | Viscosity[c]/Pa · s | | |
|---|---|---|---|---|---|---|---|---|---|---|---|---|
| ESO | | | | | | | | | | | | |
| | 239.2 | | | 240 | | | 13.4 | | | 0.38 | | |
| n = | | | | | | | | | | | | |
| | 1 | 2 | 3 | 1 | 2 | 3 | 1 | 2 | 3 | 1 | 2 | 3 |
| HEX-n | 402.2 | 778.5 | 3307.1 | 357.7 | 594.6 | 1305.4 | 13.3 | 13.1 | 13.1 | 0.87 | 1.85 | 4.20 |
| OCT-n | 421.3 | 845.8 | 3880.9 | 367.0 | 622.7 | 1389.6 | 13.3 | 13.1 | 13.0 | 0.90 | 1.94 | 3.79 |
| DEC-n | 419.1 | 871.3 | 4078.7 | 376.4 | 650.7 | 1473.7 | 13.1 | 13.0 | 12.9 | 0.79 | 1.67 | 3.45 |
| LAU-n | 350.4 | 705.9 | 2466.1 | 385.7 | 678.8 | 1557.9 | 13.1 | 13.0 | 12.8 | 0.90 | 1.88 | 3.71 |
| MYR-n | 433.7 | 925.1 | 4212.3 | 395.1 | 706.8 | 1642.0 | 13.1 | 12.9 | 12.8 | 0.89 | 1.91 | 3.61 |
| PAL-n | 411.2 | 823.7 | 2039.6 | 404.4 | 734.9 | 1726.2 | 13.0 | 12.8 | 12.7 | 0.97 | 1.91 | 3.55 |

[a]Experimental data from ASTM D1652-97 procedure B. theoretical data from calculation.
[b]Experimental data from GPC.
[c]Viscosity data from rheometer test with 1000/s shear rate at 25° C.

Preparation of Grafted Triglycerides.

The grafted triglycerides prepared and used in the examples below were grafted soybean oils, which were prepared by grafting fatty acids to the backbone of epoxidized soybean oil ("ESO"). All grafted soybean oils were synthesized by a similar procedure with varying types and amounts of the fatty acids.

The identity of the grafted triglyceride is abbreviated in the tables below by a three-letter code followed by a number. The three letter codes correspond to the parent carboxylic acid listed in the Materials section above, and the number signifies the number of equivalents of the carboxylic acid that was reacted with the epoxidized soybean oil, which is approximately equal to the number of fatty acid residues grafted onto the soybean oil. For example, "OCT-3" corresponds to a grafted triglyceride that was obtained by reacting ESO with 3 equivalents of n-octanoic acid, yielding a grafted triglyceride containing on average three —O—C(O)—C$_7$H$_{15}$ groups.

Grafted triglyceride OCT-3 was prepared via a one-batch synthesis. 28.71 g ESO (30 mmol), 13.11 g octanoic acid (90 mmol), 418.20 mg AMC-2 (1 wt %) and 41.82 mg hydroquinone (0.1 wt %) were charged into a 500 mL three-necked round-bottomed flask equipped with a reflux condenser, a magnetic stirrer and a thermometer. The flask was sealed and the mixture was heated at 70° C. for 1 h, and at 90° C. for additional 3 h with continuous stirring. The resulting product was a light green liquid with a higher viscosity than the viscosity of ESO.

Other grafted triglycerides were prepared in a similar manner, adjusting the molar ratios as needed.

Characterization of Grafted Triglyceride.

Grafted triglycerides were characterized by gel permeation chromatography (GPC), epoxy titration (ASTM D 1652-97 procedure B) and rheometry. GPC was employed to measure the composition and molecular weight distribution of prepared grafted triglycerides. A Waters GPC system (Waters Corp., Miford, Mass., USA) was equipped with two 30 cm long, 7.5 mm diameter (poly)styrene-divinyl benzene columns (PLgel 5 µm MIXED-C column and PLgel 5 µm 50 Å column) in series, a Waters 515 HPLC pump and two Waters detectors. The columns were equilibrated at 45° C. with THF as elution solvent at a flow rate of 1.0 mL/min operated by the Waters 515 HPLC pump. The effluent was monitored at room temperature with two detectors, a Waters 2410 Refractive Index Detector and a Waters 2487 Dual Absorbance Detector operating at 254 and 280 nm. Grafted triglyceride (2 mg) was dissolved in 1 mL THF and filtered before being injected into the GPC. Total monitoring duration for each sample was 25 min.

Epoxy titration was conducted by following ASTM D 1652-97 procedure B to measure EEW values of prepared grafted triglycerides. As an example, a solution was prepared with 0.4 g OCT-3, 10 mL methylene chloride, 10 mL tetraethylammonium bromide solution (0.25 g/mL) and 8 drops of 0.1% solution of crystal violet indicator in glacial acetic acid. Perchloric acid reagent (0.1 N) was used for titration. The solution exhibited a sharp color change from blue to green and the volume of perchloric acid reagent consumed was recorded. Multiple titrations were performed. The viscosity of grafted triglycerides was measured using a TA AR2000ex Rheometer (TA Instruments, New Castle, Del., USA) with a 40 mm flat plate configuration at room temperature. Samples were tested with a shear rate ranging from 0.01 to 1000 s$^{-1}$ with 10 measurements recorded at each decade, and shear stress was recorded every 2 s at each shear rate. The average of three measurements at the shear rate of 1000 s$^{-1}$ was reported as the viscosity value.

Preparation of Toughened Epoxy Thermosets.

Toughened epoxy thermosets were prepared by mixing and reacting an epoxy resin with a grafted triglyceride, and an amine curing agent.

Several experiments with up to six factors were designed, with one 6-level factor, two 3-level factors, and 3 two-level factors. The first factor was the length of the fatty acid residue on the grafted triglyceride. These consisted of residues that are 6, 8, 10, 12, 14, or 16 carbon atoms in length. The second factor was the mean number of fatty acid residues in the grafted triglyceride. These consisted of 1, 2, or 3 residues per triglyceride. The third factor was the treatment level of the grafted triglyceride in the epoxide. These levels consisted of 10, 15, and 20 wt %. The fourth factor was the identity of the epoxy resin. The epoxy resin used was either EPON 828, or EPON 1001F. The fifth factor was the identity of the curing agent. The curing agent used was either EPIKURE® W or PACM. The sixth factor was the pretreatment of the grafted triglyceride with the curing agent. In the "modified" process method, the grafted triglyceride and amine curing agent were blended at 40° C. for 11 h before being mixed with EPON 828 and/or 1001F and curing to form the thermoset. In the "unmodified" process, all components, including all epoxy resins and the amine curing agent, were mixed at the same time and cured to form the thermoset.

In the tables below, the thermosets were designated on the basis of their composition. For instance, "15% OCT3/15%1001F/70%828/P_m" represented thermoset samples composed of 15 wt % OCT-3, 15 wt % EPON 1001F and 70 wt % EPON 828, cured with a stoichiometric amount of PACM, prepared by the "modified" process method.

All thermoset samples were well mixed, degassed and cast into rubber molds with uniform dimensions of 40 mm×10 mm×5 mm. The thermoset samples cured with PACM were cured at 80° C. for 9 h and post-cured at 180° C. for another 9 h before being processed to identical dimensions for dynamic mechanical analysis (DMA). The thermoset samples cured with EPIKURE W were cured at 140° C. for 9 h and post-cured at 210° C. for another 9 h before being processed to identical dimensions for DMA.

Thermoset samples with the same composition and made by the same process were also prepared for fracture toughness testing using an INSTRON 8872 by following ASTM D5045-99 (ASTM Standard D5045-99, 2007e1, "Standard Test Methods for Plane-Strain Fracture Toughness and Strain Energy Release Rate of Plastic Materials", ASTM International, West Conshohocken, Pa., 2003, USA. These samples were cast into rubber molds with dimensions of 140 mm×14 mm×6 mm, cured following the above-described procedure and processed into a compact tension ("CT") configuration as in Test Method E 399 in ASTM D5045-99. Five to seven CT specimens were prepared for each thermoset composition.

Thermoset Properties.

Thermomechanical properties, including glass transition temperature ($T_g$) and storage modulus at room temperature, of cured samples were measured using a TA Instruments Q800 Dynamic Mechanical Analysis apparatus in single cantilever geometry. Thermoset samples with approximate dimensions of 38 mm×9 mm×4.5 mm were examined with a ramp rate of 2° C./min from room temperature to 220° C. as well as a frequency of 1 Hz and amplitude of 15 µm. Each sample was examined twice and the result of the second run was utilized to measure $T_g$ and storage modulus at room temperature. $T_g$ was assigned as the temperature at the maximum of loss modulus curve. Fracture toughness properties, such as critical strain energy release rate ($G_{1c}$) and critical stress intensity factor ($K_{1c}$) of thermoset samples were measured using an INSTRON 8872 Servohydraulic Fatigue Testing System (Norwood, Mass., USA) by following ASTM D5045-99. CT samples were processed to the dimensions of 16 mm×13 mm×5.5 mm and an 8.2 mm long notch was cut into each sample by a diamond saw. A pre-crack was made at the base of the notch by manually scoring with a sharp blade at room temperature before such samples were tested using the INSTRON 8872 in an ambient environment (64% relative humidity) with a constant crosshead speed of 1 mm/min and termination criteria of 1 mm tensile extension.

Fracture Surface Analysis.

Once CT samples were fractured, qualitative assessment of phase separation, particle size and particle size distribution on the fracture surface were investigated by image analysis using a Zeiss Supra 50VP (Zeiss AG, Jena, Germany) scanning electron microscope (SEM) in Backscatter SE2 and Inlens arrangements. SEM samples were prepared by mounting a fractured sample onto a substrate and sputtering coating with platinum to a nominal thickness of 7 to 9 nm on both the fracture surface and side surfaces of the sample.

Examples 1 to 109

Eighteen grafted triglycerides were prepared by a reaction of an epoxidized soybean oil triglyceride with the six different carboxylic acids mentioned above at molar ratios of 1:1, 1:2, and 1:3. These 18 grafted triglycerides were further reacted with EPON 828 at three different weight percentages as specified above, and with two different curing agents as specified above, using the two different procedures described above, to generate 109 samples, including control samples. The properties of selected samples are summarized in Tables 2 to 5 and 9.

The glass transition temperature ($T_g$) values of the prepared thermosets are presented in Table 2. The $T_g$ values were assigned as the temperature corresponding to the peak of the loss modulus curve from DMA. 15% ESO/85%828/P and 15% ESO/85%828/E samples possessing $T_g$s of 120° C. and 131° C., respectively, were prepared as control samples. All thermosets prepared with grafted triglycerides presented a higher $T_g$ than the control sample when cured by the same amine curing agent, but also had a lower $T_g$ than the 100%828/P and 100%828/E samples. No statistically significant difference was apparent between the $T_g$ prepared by the method including pretreatment of the grafted triglyceride with PACM curing agent.

TABLE 2

Glass transition temperature ($T_g$) of thermosets prepared from a reaction of EPON 828 with grafted triglycerides and a curing agent

| | $T_g{}^a$/° C. | |
|---|---|---|
| | PACM[b] | EPIKURE W[b] |
| 100%828 | 167 | 185 |
| 15%ESO/85%828 | 120 | 131 |

| | PACM[b] | | | PACM[c] n = | | | EPIKURE W[b] | | |
|---|---|---|---|---|---|---|---|---|---|
| | 1 | 2 | 3 | 1 | 2 | 3 | 1 | 2 | 3 |
| 10%HEX-n/90%828 | 135 | 138 | 139 | 135 | 136 | 135 | 150 | 159 | 155 |
| 15%HEX-n/85%828 | 135 | 144 | 150 | 133 | 140 | 143 | 135 | 138 | 150 |
| 20%HEX-n/80%828 | 137 | 149 | 155 | — | — | — | 114 | 143 | 174 |
| 10%OCT-n/90%828 | 139 | 152 | 155 | 140 | 148 | 153 | 159 | 161 | 183 |
| 15%OCT-n/85%828 | 137 | 151 | 157 | 138 | 149 | 153 | 137 | 171 | 180 |
| 20%OCT-n/80%828 | 143 | 157 | 163 | — | — | — | 132 | 171 | 184 |
| 10%DEC-n/90%828 | 141 | 158 | 160 | 144 | 148 | 158 | 148 | 173 | 184 |
| 15%DEC-n/85%828 | 140 | 156 | 159 | 144 | 155 | 159 | 143 | 182 | 191 |
| 10%LAU-n/90%828 | 150 | 161 | 164 | 150 | 160 | 165 | 152 | 187 | 195 |
| 15%LAU-n/85%828 | 143 | 161 | 166 | 145 | 157 | 163 | 153 | 185 | 189 |
| 10%MYR-n/90%828 | 151 | 159 | 156 | — | — | — | 165 | 186 | 193 |
| 15%MYR-n/85%828 | 150 | 155 | 156 | — | — | — | 163 | 167 | — |
| 10%PAL-n/90%828 | 157 | 164 | 165 | — | — | — | 174 | 192 | — |
| 15%PAL-n/85%E828 | 153 | 161 | 156 | — | — | — | 170 | 188 | — |

[a]$T_g$ assigned as the temperature corresponding to the peak of the loss modulus curve.
[b]$T_g$ of thermosets prepared using the unmodified process.
[c]$T_g$ of thermosets prepared using the modified process.

The storage modulus of these thermosets, as measured at 0° C., is presented in Table 3.

TABLE 3

Storage modulus (E') of thermosets prepared from a reaction of EPON 828 with grafted triglycerides and a curing agent

| | Storage Modulus[a]/GPa | |
|---|---|---|
| | PACM[b] | EKIPURE W[b] |
| 100%828 | 2.23 | 2.44 |
| 15%ESO/85%828 | 2.01 | 2.19 |

| | PACM[b] | | | PACM[c] n = | | | EKIPURE W[b] | | |
|---|---|---|---|---|---|---|---|---|---|
| | 1 | 2 | 3 | 1 | 2 | 3 | 1 | 2 | 3 |
| 10%HEX-n/90%828 | 2.12 | 2.14 | 2.20 | 2.17 | 2.18 | 2.26 | 2.40 | 2.21 | 2.04 |
| 15%HEX-n/85%828 | 2.24 | 1.97 | 1.92 | 2.05 | 1.95 | 1.87 | 2.35 | 2.25 | 2.30 |
| 20%HEX-n/80%828 | — | — | — | — | — | — | — | — | — |
| 10%OCT-n/90%828 | 2.19 | 1.93 | 2.11 | 2.07 | 1.99 | 1.90 | 2.05 | 2.16 | 1.79 |
| 15%OCT-n/85%828 | 1.98 | 1.95 | 1.91 | 1.89 | 1.69 | 1.73 | 1.73 | 1.54 | 1.56 |

TABLE 3-continued

Storage modulus (E') of thermosets prepared from a reaction of EPON 828 with grafted triglycerides and a curing agent

| | Storage Modulus[a]/GPa | | | | | | | | |
|---|---|---|---|---|---|---|---|---|---|
| 20%OCT-n/80%828 | — | — | — | — | — | — | — | — | — |
| 10%DEC-n/90%828 | 2.03 | 1.81 | 1.90 | 1.93 | 2.03 | 1.93 | 2.07 | 1.81 | 1.52 |
| 15%DEC-n/85%828 | 1.86 | 1.82 | 1.77 | 1.76 | 1.76 | 1.67 | 2.00 | 1.27 | 1.56 |
| 10%LAU-n/90%828 | 1.93 | 1.84 | 1.83 | 1.92 | 1.79 | 1.90 | 2.08 | 1.78 | 1.75 |
| 15%LAU-n/85%828 | 1.84 | 1.72 | 1.83 | 1.84 | 1.70 | 1.64 | 1.92 | 1.64 | 1.60 |
| 10%MYR-n/90%828 | 2.00 | 1.75 | 1.80 | — | — | — | 1.95 | 1.75 | 1.69 |
| 15%MYR-n/85%828 | 1.68 | 1.68 | 1.67 | — | — | — | 1.71 | 1.62 | — |
| 10%PAL-n/90%828 | 1.90 | 1.84 | 1.81 | — | — | — | 1.70 | 1.55 | — |
| 15%PAL-n/85%828 | 1.71 | 1.67 | 1.68 | — | — | — | 1.65 | 1.50 | — |

[a]Storage modulus at 0° C. assigned from DMA $T_g$ measurements.
[b]Storage modulus of thermosets prepared using the unmodified process.
[c]Storage modulus of thermosets prepared using the modified process.

The critical stress intensity factor ($K_{1c}$) of the thermosets HEX and OCT were by obtained by following the method of ASTM D5045-99, and are presented below in Table 4. Samples 100%828/P, 100%828/E, 15% ESO/85%828/P and 15% ESO/85%828/E (i.e., thermosets without grafted triglycerides) were prepared as control samples. Thermosets HEX and OCT presented a higher $K_{1c}$ value than 100%828/P and 100%828/E samples, respectively, meaning that the grafted triglycerides helped improve the fracture toughness. Thermosets prepared with grafted triglycerides exhibit similar $K_{1c}$ values as thermosets prepared with ESO. No noticeable differences were observed between the $K_{1c}$ value of thermosets prepared by the modified process vs thermosets prepared by the unmodified process.

Table 5 below summarizes $G_{1c}$ data for thermosets HEX and OCT as calculated from the $K_{1c}$ values in Table 4 above. Thermosets HEX and OCT presented higher $G_{1c}$ values than 100%828/P or 100%828/E control samples, respectively, confirming that the use of grafted triglycerides improves fracture toughness. Some of the thermosets HEX and OCT possess $G_{1c}$ values comparable or higher than those for thermosets prepared with ESO that was not grafted. The modified process method did not consistently impact $G_{1c}$ when compared to the unmodified method.

TABLE 4

$K_{1c}$ of thermosets prepared from a reaction of EPON 828 with grafted triglycerides HEX or OCT and a curing agent

| | $K_{1c}$/MPa · m$^{1/2}$ | |
|---|---|---|
| | PACM[a] | EKIPURE W[a] |
| 100%828 | 0.70 ± 0.03 | 0.58 ± 0.11 |
| 15%ESO/85%828 | 1.04 ± 0.14 | 0.71 ± 0.18 |

| | PACM[a] | | | PACM[b] n = | | | EKIPURE W[a] | | |
|---|---|---|---|---|---|---|---|---|---|
| | 1 | 2 | 3 | 1 | 2 | 3 | 1 | 2 | 3 |
| 10%HEX-n/90%828 | 0.88 ± 0.22 | 0.88 ± 0.24 | 0.98 ± 0.13 | 0.80 ± 0.16 | 0.88 ± 0.22 | 0.82 ± 0.18 | 0.57 ± 0.08 | 0.62 ± 0.10 | 0.52 ± 0.06 |
| 15%HEX-n/85%828 | 1.06 ± 0.11 | 1.05 ± 0.09 | 1.00 ± 0.07 | 1.05 ± 0.18 | 1.03 ± 0.08 | 0.96 ± 0.06 | 0.57 ± 0.03 | 0.66 ± 0.07 | 0.67 ± 0.11 |
| 20%HEX-n/80%828 | 1.31 ± 0.11 | 1.09 ± 0.07 | 0.93 ± 0.09 | — | — | — | 0.91 ± 0.14 | 0.89 ± 0.13 | 0.71 ± 0.06 |
| 10%OCT-n/90%828 | 1.09 ± 0.23 | 1.07 ± 0.14 | 0.80 ± 0.08 | 0.88 ± 0.10 | 0.94 ± 0.14 | 0.87 ± 0.07 | 0.70 ± 0.12 | 0.61 ± 0.03 | 0.63 ± 0.04 |
| 15%OCT-n/85%828 | 0.93 ± 0.03 | 0.87 ± 0.04 | 0.82 ± 0.07 | 0.96 ± 0.11 | 1.00 ± 0.07 | 0.86 ± 0.05 | 0.77 ± 0.09 | 0.84 ± 0.04 | 0.68 ± 0.04 |
| 20%OCT-n/80%828 | 1.05 ± 0.07 | 1.01 ± 0.08 | 0.87 ± 0.05 | — | — | — | 0.94 ± 0.10 | 0.69 ± 0.09 | 0.63 ± 0.05 |

[a]$K_{1c}$ of thermosets prepared using the unmodified process.
[b]$K_{1c}$ of thermosets prepared using the modified process.

TABLE 5

$G_{1c}$ of thermosets prepared from a reaction of EPON 828 with grafted triglycerides HEX or OCT and a curing agent

| | $G_{1c}/J/m^2$ | |
|---|---|---|
| | PACM[a] | EPIKURE W[a] |
| 100%828 | 221 ± 21 | 135 ± 56 |
| 15%ESO/85%828 | 505 ± 128 | 224 ± 116 |

| | PACM[a] | | | PACM[b] | | | EPIKURE W[a] | | |
|---|---|---|---|---|---|---|---|---|---|
| | | | | n = | | | | | |
| | 1 | 2 | 3 | 1 | 2 | 3 | 1 | 2 | 3 |
| 10%HEX-n/90%828 | 341 ± 183 | 342 ± 222 | 385 ± 105 | 310 ± 124 | 358 ± 185 | 298 ± 134 | 127 ± 35 | 193 ± 59 | 134 ± 32 |
| 15%HEX-n/85%828 | 440 ± 91 | 467 ± 58 | 456 ± 59 | 516 ± 176 | 497 ± 78 | 450 ± 50 | 174 ± 18 | 187 ± 38 | 252 ± 86 |
| 20%HEX-n/80%828 | 929 ± 165 | 676 ± 90 | 476 ± 94 | — | — | — | 359 ± 105 | 389 ± 112 | 295 ± 51 |
| 10%OCT-n/90%828 | 500 ± 212 | 532 ± 147 | 282 ± 56 | 318 ± 69 | 395 ± 111 | 332 ± 58 | 237 ± 79 | 187 ± 19 | 225 ± 26 |
| 15%OCT-n/85%828 | 384 ± 23 | 337 ± 32 | 308 ± 57 | 402 ± 100 | 493 ± 75 | 388 ± 47 | 274 ± 64 | 366 ± 31 | 257 ± 32 |
| 20%OCT-n/80%828 | 602 ± 78 | 599 ± 90 | 435 ± 51 | — | — | — | 409 ± 82 | 280 ± 73 | 246 ± 42 |

[a]$G_{1c}$ of thermosets prepared using the unmodified process.
[b]$G_{1c}$ of thermosets prepared using the modified process.

One of the factors that was considered when designing the above experiments was the pre-blending of the grafted triglyceride with the curing agent. The data in Tables 2 to 5 shows that there is no measurable effect of this factor on the properties of the final thermoset. Thus, for further examples this factor was dropped, and only the unmodified procedure was used.

Examples 110 to 141

Six of the eighteen previously prepared grafted triglycerides (i.e., HEX-1, HEX-2, HEX-3, OCT-1, OCT-2, OCT-3) were reacted with EPON 828 or a 3:14 mixture of EPON 1001F and EPON 828 at a 15:85 weight ratio, and one of two different aforementioned amine curing agents, using the unmodified procedure to prepare thermosets comprising grafted triglycerides. The properties of the products of these examples are shown in Tables 6 to 9.

Table 6 below summarizes the glass transition data for the thermosets. Samples 17.65%1001F/82.35%828/P, 17.65%1001F/82.35%828/E, 15% ESO/15%1001F/70%828/P and 15% ESO/15%1001F/70%828/E were prepared as control samples. The weight ratio of EPON 1001F to EPON 828 in the 17.65%1001F/82.35%828 samples was the same as that in the 15% ESO/15%1001F/70%828 samples, to allow for comparison of the samples.

The data in Table 6 shows several trends. First, thermosets prepared by reacting an EPON 1001F/EPON 828 epoxy blend showed lower $T_g$s than thermosets prepared by reacting EPON 828 only. Secondly, thermosets prepared by a reaction that comprises grafted triglycerides exhibit a lower $T_g$ when compared with thermosets prepared without grafted triglycerides. Thirdly, thermosets prepared by reacting EPON 1001F and grafted triglycerides consistently exhibited higher $T_g$s compared to thermosets of control samples prepared by reacting EPON 1001F with ESO.

TABLE 6

Glass transition temperature ($T_g$) of thermosets prepared from a reaction of EPON 828 or an EPON 828/EPON 1001F mixture with grafted triglycerides HEX or OCT and a curing agent

| | $T_g^{a}/°$ C. | |
|---|---|---|
| | PACM | EPIKURE W |
| 100%828 | 167 | 185 |
| 17.65%1001F/82.35%828 | 163 | 182 |
| 15%ESO/85%828 | 120 | 131 |
| 15%ESO/15%1001F/70%828 | 115 | 121 |

| | PACM | | | EPIKURE W | | |
|---|---|---|---|---|---|---|
| | | | | n = | | |
| | 1 | 2 | 3 | 1 | 2 | 3 |
| 15%HEX-n/85%828 | 135 | 144 | 150 | 135 | 138 | 150 |
| 15%HEX-n/15%1001F/70%828 | 119 | 133 | 145 | 123 | 126 | 144 |
| 15%OCT-n/85%828 | 136 | 151 | 157 | 137 | 171 | 180 |
| 15%OCT-n/15%1001F/70%828 | 131 | 142 | 151 | 125 | 153 | 169 |

[a]$T_g$ was assigned as the temperature corresponding to the peak of loss modulus curve.

The critical stress intensity factor ($K_{1c}$) of the prepared thermosets was obtained by following the method of ASTM D5045-99, and the results are presented below in Table 7. Samples labeled 100%828, 17.65%1001F/82.35%828, 15% ESO/85%828, and 15% ESO/15%1001F/70%828 (i.e., thermosets without grafted triglycerides) are control samples.

Thermosets prepared with EPON 1001F showed higher $K_{1c}$ values than for thermosets prepared without EPON 1001F. Thermosets prepared with grafted triglyceride exhibited higher $K_{1c}$ than thermosets prepared without the grafted triglyceride. Thermosets prepared by using EPON 1001F and grafted triglycerides exhibit similar or higher $K_{1c}$ values than control samples prepared by using EPON 1001F and ESO.

TABLE 7

$K_{1c}$ of thermosets prepared from a reaction of EPON 828 or an EPON 828/EPON 1001F mixture with grafted triglycerides HEX or OCT and a curing agent.

| | $K_{1c}$/MPa·m$^{1/2}$ | |
|---|---|---|
| | PACM | EPIKURE W |
| 100%28 | 0.70 ± 0.03 | 0.58 ± 0.11 |
| 17.65%1001F/82.35%828 | 0.87 ± 0.06 | 0.71 ± 0.12 |
| 15%ESO/85%828 | 1.04 ± 0.14 | 0.71 ± 0.18 |
| 15%ESO/15%100F/70%828 | 1.25 ± 0.04 | 0.82 ± 0.15 |

| | PACM | | | EPIKURE W | | |
|---|---|---|---|---|---|---|
| | n = | | | | | |
| | 1 | 2 | 3 | 1 | 2 | 3 |
| 15%HEX-n/85%828 | 1.06 ± 0.11 | 1.05 ± 0.09 | 1.00 ± 0.07 | 0.57 ± 0.03 | 0.66 ± 0.07 | 0.67 ± 0.11 |
| 15%HEX-n/15%1001F/70%828 | 1.10 ± 0.16 | 1.19 ± 0.13 | 1.29 ± 0.13 | 0.89 ± 0.11 | 0.95 ± 0.08 | 0.93 ± 0.07 |
| 15%OCT-n/85%828 | 0.93 ± 0.03 | 0.87 ± 0.04 | 0.82 ± 0.07 | 0.77 ± 0.09 | 0.84 ± 0.04 | 0.68 ± 0.04 |
| 15%OCT-n/15%100F/70%828 | 1.44 ± 0.11 | 1.22 ± 0.08 | 1.16 ± 0.06 | 0.93 ± 0.16 | 0.96 ± 0.06 | 0.85 ± 0.09 |

The critical stress intensity factor ($G_{1c}$) of the thermosets HEX and OCT were obtained by following the method of ASTM D5045-99, and are presented below in Table 8. Samples 100%828/P, 100%828/E, 15% ESO/85%828/P and 15% ESO/85%828/E (i.e., thermosets without grafted triglycerides) are control samples. Thermosets prepared with EPON 1001F showed higher $G_{1c}$ values than thermosets prepared without EPON 1001F. Thermosets prepared with grafted triglycerides exhibited higher $G_{1c}$ values than thermosets prepared without grafted triglycerides. Thermosets prepared with grafted triglycerides exhibited similar or even higher $G_{1c}$ values than thermosets prepared with ESO.

TABLE 8

$G_{1c}$ of thermosets prepared from a reaction of EPON 828 or an EPON 828/EPON 1001F mixture with grafted triglycerides HEX or OCT and a curing agent.

| | $G_{1c}$/J/m$^2$ | |
|---|---|---|
| | PACM | EPIKURE W |
| 100%828 | 221 ± 21 | 135 ± 56 |
| 17.65%1001F/82.35%828 | 376 ± 53 | 242 ± 82 |
| 15%ESO/85%828 | 505 ± 128 | 224 ± 116 |
| 15%ESO/15%1001F/70%828 | 712 ± 48 | 295 ± 104 |

| | PACM | | | EPIKURE W | | |
|---|---|---|---|---|---|---|
| | n = | | | | | |
| | 1 | 2 | 3 | 1 | 2 | 3 |
| 15%HEX-n/85%828 | 440 ± 91 | 467 ± 58 | 456 ± 59 | 174 ± 18 | 187 ± 38 | 252 ± 86 |
| 15%HEX-n/15%1001F/70%828 | 573 ± 163 | 692 ± 147 | 988 ± 193 | 330 ± 84 | 385 ± 65 | 387 ± 56 |
| 15%OCT-n/85%828 | 384 ± 23 | 337 ± 32 | 308 ± 57 | 274 ± 64 | 366 ± 31 | 257 ± 32 |
| 15%OCT-n/15%1001F/70%828 | 1015 ± 152 | 730 ± 89 | 846 ± 92 | 391 ± 133 | 497 ± 65 | 421 ± 88 |

Samples selected from Examples 1 to 141 were tested for transparency, phase separation and fracture surface morphology. Thermosets without grafted triglycerides did not possess phase separation, and are transparent to the naked-eye. Some thermosets prepared with grafted triglycerides did not present phase separation and appeared transparent. Also, some thermosets prepared with grafted triglycerides phase separated, as indicated by SEM images, but nonetheless were transparent to the naked eye. Typically, the phase separation size of these thermoset samples was below 320 nm. Some thermosets appeared cloudy, and they consistently presented phase separation when viewed in SEM images. The phase separation size impacted the fracture toughness and glass transition properties of thermosets blended with prepared grafted triglycerides. In general, thermosets prepared with grafted triglycerides greatly improved the fracture toughness properties of traditional epoxy matrix without sacrificing $T_g$ properties compared to thermosets prepared with ESO.

TABLE 9

Transparency, phase separation and fracture surface morphology of bio-rubber thermosets prepared using unmodified and modified process methods

|  | Sample Transparency | Phase Separation | % Area | Average Diameter/nm |
|---|---|---|---|---|
| Unmodified |  |  |  |  |
| 100% 828/E | YES | NO |  |  |
| 100% 828/P | YES | NO |  |  |
| 15% ESO/85% 828/E | YES | NO |  |  |
| 15% ESO/85% 828/P | YES | NO |  |  |
| 10% HEX1/90% 828/E | YES | NO |  |  |
| 10% HEX1/90% 828/P | YES | NO |  |  |
| 15% HEX1/85% 828/E | YES | NO |  |  |
| 15% HEX1/85% 828/P | YES | YES | 10.8 | 298 |
| 10% HEX2/90% 828/E | YES | NO |  |  |
| 10% HEX2/90% 828/P | YES | NO |  |  |
| 15% HEX2/85% 828/E | YES | NO |  |  |
| 15% HEX2/85% 828/P | YES | YES | 11.4 | 278 |
| 10% HEX3/90% 828/E | YES | NO |  |  |
| 10% HEX3/90% 828/P | YES | YES | 2.2 | 95 |
| 15% HEX3/85% 828/E | YES | NO |  |  |
| 15% HEX3/85% 828/P | YES | YES | 13.6 | 273 |
| 10% OCT1/90% 828/E | YES | NO |  |  |
| 10% OCT1/90% 828/P | NO | YES | 4.9 | 191 |
| 15% OCT1/85% 828/E | YES | YES | 0.2 | 185 |
| 15% OCT1/85% 828/P | NO | YES | 10.7 | 239 |
| 10% OCT2/90% 828/E | YES | YES | 0.3 | 209 |
| 10% OCT2/90% 828/P | NO | YES | 9.6 | 224 |
| 15% OCT2/85% 828/E | NO | YES | 15.1 | 573 |
| 15% OCT2/85% 828/P | NO | YES | 12.6 | 290 |
| 10% OCT3/90% 828/E | NO | YES | 9.0 | 614 |
| 10% OCT3/90% 828/P | NO | YES | 8.2 | 245 |
| 15% OCT3/85% 828/E | NO | YES | 15.1 | 660 |
| 15% OCT3/85% 828/P | NO | YES | 14.1 | 363 |
| 10% DEC1/90% 828/E | YES | NO |  |  |
| 10% DEC1/90% 828/P | NO | YES | 6.1 | 231 |
| 15% DEC1/85% 828/E | NO | YES | 0.7 | 241 |
| 15% DEC1/85% 828/P | NO | YES | 18.2 | 307 |
| 10% DEC2/90% 828/E | NO | YES | 11.3 | 510 |
| 10% DEC2/90% 828/P | NO | YES | 12.2 | 317 |
| 15% DEC2/85% 828/E | NO | YES | 22.5 | 982 |
| 15% DEC2/85% 828/P | NO | YES | 15.9 | 386 |
| 10% DEC3/90% 828/E | NO | YES | 15.6 | 1171 |
| 10% DEC3/90% 828/P | NO | YES | 15.1 | 435 |
| 15% DEC3/85% 828/E | NO | YES | 19.6 | 1449 |
| 15% DEC3/85% 828/P | NO | YES | 22.2 | 572 |
| 10% LAU1/90% 828/E | YES | NO |  |  |
| 10% LAU1/90% 828/P | NO | YES | 10.9 | 329 |
| 15% LAU1/85% 828/E | NO | YES | 8.2 | 943 |
| 15% LAU1/85% 828/P | NO | YES | 15.7 | 408 |
| 10% LAU2/90% 828/E | NO | YES | 11.6 | 700 |
| 10% LAU2/90% 828/P | NO | YES | 12.9 | 533 |
| 15% LAU2/85% 828/E | NO | YES | 20.0 | 1078 |
| 15% LAU2/85% 828/P | NO | YES | 20.2 | 530 |
| 10% LAU3/90% 828/E | NO | YES | 14.3 | 1212 |
| 10% LAU3/90% 828/P | NO | YES | 13.2 | 852 |
| 15% LAU3/85% 828/E | NO | YES | 15.4 | 1394 |
| 15% LAU3/85% 828/P | NO | YES | 21.3 | 725 |
| 17.65% 1001F/82.35% 828/E | YES | NO |  |  |
| 17.65% 1001F/82.35% 828/P | YES | NO |  |  |
| 15% ESO/15% 1001F/70% 828/E | YES | NO |  |  |
| 15% ESO/15% 1001F/70% 828/P | YES | NO |  |  |
| 15% HEX1/15% 1001F/70% 828/E | YES | NO |  |  |
| 15% HEX1/15% 1001F/70% 828/P | YES | YES | 0.3 | 213 |
| 15% HEX2/15% 1001F/70% 828/E | YES | NO |  |  |
| 15% HEX2/15% 1001F/70% 828/P | NO | YES | 10.6 | 568 |
| 15% HEX3/15% 1001F/70% 828/E | NO | YES | 9.5 | 1163 |
| 15% HEX3/15% 1001F/70% 828/P | NO | YES | 14.1 | 589 |
| 15% OCT1/15% 1001F/70% 828/E | YES | NO |  |  |
| 15% OCT1/15% 1001F/70% 828/P | NO | YES | 10.9 | 453 |
| 15% OCT2/15% 1001F/70% 828/E | NO | YES | 12.4 | 1074 |
| 15% OCT2/15% 1001F/70% 828/P | NO | YES | 13.3 | 381 |
| 15% OCT3/15% 1001F/70% 828/E | NO | YES | 15.2 | 1760 |
| 15% OCT3/15% 1001F/70% 828/P | NO | YES | 19.7 | 472 |
| Modified |  |  |  |  |
| 10% HEX1/90% 828/P | YES | NO |  |  |
| 15% HEX1/85% 828/P | NO | YES | 8.4 | 274 |

TABLE 9-continued

Transparency, phase separation and fracture surface morphology of bio-rubber thermosets prepared using unmodified and modified process methods

|  | Sample Transparency | Phase Separation | % Area | Average Diameter/nm |
|---|---|---|---|---|
| 10% HEX2/90% 828/P | YES | NO | | |
| 15% HEX2/85% 828/P | NO | YES | 11.1 | 270 |
| 10% HEX3/90% 828/P | YES | NO | | |
| 15% HEX3/85% 828/P | NO | YES | 12.1 | 296 |
| 10% OCT1/90% 828/P | YES | YES | 1.5 | 107 |
| 15% OCT1/85% 828/P | NO | YES | 13.3 | 192 |
| 10% OCT2/90% 828/P | NO | YES | 10.3 | 172 |
| 15% OCT2/85% 828/P | NO | YES | 14.8 | 195 |
| 10% OCT3/90% 828/P | NO | YES | 9.0 | 220 |
| 15% OCT3/85% 828/P | NO | YES | 15.2 | 298 |
| 10% DEC1/90% 828/P | YES | YES | 3.8 | 194 |
| 15% DEC1/85% 828/P | NO | YES | 17.7 | 276 |
| 10% DEC2/90% 828/P | YES | YES | 10.0 | 264 |
| 15% DEC2/85% 828/P | NO | YES | 15.7 | 303 |
| 10% DEC3/90% 828/P | YES | YES | 12.8 | 313 |
| 15% DEC3/85% 828/P | NO | YES | 19.0 | 363 |
| 10% LAU1/90% 828/P | NO | YES | 10.2 | 239 |
| 15% LAU1/85% 828/P | NO | YES | 16.2 | 294 |
| 10% LAU2/90% 828/P | NO | YES | 11.6 | 344 |
| 15% LAU2/85% 828/P | NO | YES | 17.1 | 402 |
| 10% LAU3/90% 828/P | NO | YES | 12.9 | 368 |
| 15% LAU3/85% 828/P | NO | YES | 22.9 | 523 |

1. YES in the sample transparency column means that the sample was transparent as verified by observation with the naked eye
2. NO in the sample transparency column means cloudy as verified by observation with the naked eye
3. YES in the phase separation column means phase separation occurred in samples as verified by SEM investigation
4. NO means no phase separation as verified by SEM investigation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

What is claimed is:

1. An epoxy thermoset prepared by reaction of:
   (a) a grafted triglyceride prepared by reacting a fatty acid that contains from about 4 to about 30 carbon atoms per molecule directly with an epoxidized triglyceride such that 10-100% of the epoxy groups of the epoxidized triglyceride are reacted with the carboxylic acid group of the fatty acid, said epoxidized triglyceride optionally containing one or more carbon-carbon double bonds which were not converted to epoxy groups during epoxidation of the triglyceride, and said optional one or more carbon-carbon double bonds are the only double bonds present in the epoxidized triglyceride when reacted with said fatty acid;
   (b) an epoxy resin; and
   (c) an amine curing agent;
wherein the weight ratio of the grafted triglyceride to the epoxy resin is in the range of 1:99 to 99:1.

2. The epoxy thermoset of claim 1, wherein a molar ratio of the fatty acid to the epoxidized triglyceride is from about 0.1:1 to about 4:1.

3. The epoxy thermoset of claim 1, wherein a molar ratio of the fatty acid to the epoxidized triglyceride is from about 1:1 to about 3.5:1.

4. The epoxy thermoset of claim 1, wherein a molar ratio of the fatty acid to the epoxidized triglyceride is from about 2:1 to about 3:1.

5. The epoxy thermoset of claim 1, wherein the grafted triglyceride has a molecular weight of from about 990 g/mole to about 3280 g/mole.

6. The epoxy thermoset of claim 1, wherein the grafted triglyceride has a molecular weight of from about 1200 g/mole to about 2000 g/mole.

7. The epoxy thermoset of claim 1, wherein the triglyceride is obtained from a material selected from a plant oil, an animal oil, an algae oil, and a mixture thereof.

8. The epoxy thermoset of claim 1, wherein the grafted triglyceride comprises one or more epoxy groups.

9. The epoxy thermoset of claim 1, wherein the epoxy resin is selected from bisphenol A epoxy resin, bisphenol F epoxy resin, novolac epoxy resin, aliphatic epoxy resin, and glycidylamine epoxy resin.

10. The epoxy thermoset of claim 1, wherein the epoxy resin is a bisphenol-A diglycidyl ether epoxy resin monomer or an oligomer thereof.

11. The epoxy thermoset of claim 1, wherein the fatty acid is selected from n-hexanoic acid, n-octanoic acid, n-decanoic acid, n-dodecanoic acid, lauric acid, n-tetradecanoic acid, myristic acid, n-hexadecanoic acid, palmitic acid, stearic acid, oleic acid, linoleic acid, linolenic acid, arachidic acid, gadoleic acid, behenic acid and erucic acid.

12. The epoxy thermoset of claim 1, wherein the weight ratio of the triglyceride to the epoxy resin is in the range of 1:99 to 30:70.

13. The epoxy thermoset of claim 1, wherein the fatty acid contains 5 to 20 carbon atoms per molecule.

14. The epoxy thermoset of claim 1, wherein the fatty acid contains 6 to 16 carbon atoms per molecule.

15. The epoxy thermoset of claim 1, wherein a 5 millimeter thick sample of the epoxy thermoset is translucent.

16. A composite comprising the epoxy thermoset of claim 1.

17. A composite as claimed in claim 16 comprising one or more materials selected from fibers, reinforcing materials, clays, silicates, fillers and whiskers.

18. A composite as claimed in claim 16 comprising one or more additives selected from colorants, pigments, carbon black, impact modifiers, antioxidants, stabilizers, flame retardants, reheating aids, crystallization aids, oxygen scavengers, plasticizers, flexibilizers, nucleating agents, foaming agents, and mold release agents.

19. An epoxy thermoset prepared by reaction of:
(a) a grafted triglyceride prepared by reacting epoxy groups of an epoxidized triglyceride with a carboxylic acid group of a fatty acid containing from about 4 to about 30 carbon atoms per molecule, such that 10-100% of the epoxy groups of the epoxidized triglyceride are reacted with the carboxylic acid group of the fatty acid; and wherein all of the reacted epoxy groups of the grafted triglyceride have been reacted with the carboxylic acid group of the fatty acid;
(b) an epoxy resin; and
(c) an amine curing agent;
wherein the weight ratio of the grafted triglyceride to the epoxy resin is in the range of 1:99 to 99:1.

\* \* \* \* \*